United States Patent
Miller et al.

(10) Patent No.: US 10,247,093 B2
(45) Date of Patent: Apr. 2, 2019

(54) VARIABLE COMPRESSION RATIO CONNECTING ROD

(71) Applicant: FEDERAL-MOGUL CORPORATION, Southfield, MI (US)

(72) Inventors: Andrew J. Miller, Plymouth, MI (US); Bruce C. Inwood, Fenton, MI (US)

(73) Assignee: Tenneco Inc., Lake Forest, IL (US)

( * ) Notice: Subject to any disclaimer, the term of this patent is extended or adjusted under 35 U.S.C. 154(b) by 35 days.

(21) Appl. No.: 15/409,928

(22) Filed: Jan. 19, 2017

(65) Prior Publication Data

US 2017/0211470 A1 Jul. 27, 2017

Related U.S. Application Data

(60) Provisional application No. 62/281,489, filed on Jan. 21, 2016.

(51) Int. Cl.
*F02B 75/04* (2006.01)
*F16C 9/04* (2006.01)
(Continued)

(52) U.S. Cl.
CPC .............. *F02B 75/045* (2013.01); *F16C 7/06* (2013.01); *F16C 9/04* (2013.01); *F16C 23/10* (2013.01);
(Continued)

(58) Field of Classification Search
CPC .. F02B 75/045; F16C 7/06; F16C 9/04; F16C 2360/22; F16J 1/16; F16J 7/00
See application file for complete search history.

(56) References Cited

U.S. PATENT DOCUMENTS 1,566,720 A * 12/1925 Andreau ................. F16H 21/18
123/197.4
2,029,169 A 1/1936 Hironaka
(Continued)

FOREIGN PATENT DOCUMENTS

DE 3818357 A1 3/1989
DE 19503425 A1 8/1996
(Continued)

OTHER PUBLICATIONS

International Search Report, dated Mar. 15, 2017 (PCT/US2017/014213).

*Primary Examiner* — Jacob Amick
*Assistant Examiner* — Charles Brauch
(74) *Attorney, Agent, or Firm* — Robert L. Stearns; Dickinson Wright, PLLC (57) ABSTRACT

An assembly including a connecting rod, a bushing, and a locking pin capable of providing different compression ratios in an engine is provided. The bushing is disposed in a bore of the connecting rod. An outer surface of the bushing includes a pair of notches, and an inner surface of the connecting rod includes a corresponding notch for receiving the locking pin. The notches are spaced from one another by greater than 180° and by no more than 190°. The locking pin is movable in the notch, allowing the bushing to rotate from a low compression position to a high compression position, or vice versa. The bushing has a varying thickness, and thus a center axis of an opening of the bushing is closer to the shaft of the connecting rod body when the bushing is in the low compression orientation than in the high compression orientation.

20 Claims, 7 Drawing Sheets

(51) Int. Cl.
*F16J 7/00* (2006.01)
*F16C 7/06* (2006.01)
*F16C 23/10* (2006.01)
*F16J 1/16* (2006.01)

(52) U.S. Cl.
CPC . *F16J 1/16* (2013.01); *F16J 7/00* (2013.01); *F16C 2360/22* (2013.01)

(56) References Cited

U.S. PATENT DOCUMENTS

| | | | |
|---|---|---|---|
| 2,151,853 A | 3/1939 | Jonville | |
| 4,687,348 A | 8/1987 | Naruoka et al. | |
| 4,721,073 A | 1/1988 | Naruoka et al. | |
| 4,830,517 A | 5/1989 | Naruoka et al. | |
| 4,864,975 A | 9/1989 | Hasegawa | |
| 6,273,612 B1* | 8/2001 | Ono | F16C 9/04 384/276 |
| 7,527,026 B1 | 5/2009 | Berger | |
| 7,533,638 B1 | 5/2009 | Berger | |
| 7,546,820 B2 | 6/2009 | Berger | |
| 7,685,974 B2 | 3/2010 | Berger | |
| 8,393,307 B2 | 3/2013 | Lee et al. | |
| 2005/0150471 A1* | 7/2005 | Styron | F02B 75/045 123/48 B |
| 2007/0098589 A1* | 5/2007 | Aihara | C22C 38/002 420/104 |
| 2007/0265101 A1* | 11/2007 | Maierbacher | F16D 3/68 464/87 |
| 2007/0289351 A1* | 12/2007 | Glenn | B23P 9/025 72/370.07 |
| 2009/0107467 A1* | 4/2009 | Berger | F02D 15/04 123/48 B |
| 2009/0145394 A1 | 6/2009 | Nigro et al. | |
| 2010/0300282 A1* | 12/2010 | Lapp | F16C 7/06 92/172 |
| 2014/0091507 A1* | 4/2014 | Oldfield | B60G 7/001 267/292 |
| 2015/0040870 A1 | 2/2015 | Nowak et al. | |

FOREIGN PATENT DOCUMENTS

| | | |
|---|---|---|
| JP | S5838343 A | 3/1983 |
| JP | S5891340 A | 5/1983 |
| JP | S58172431 A | 10/1983 |
| JP | S6312837 A | 1/1988 |
| JP | H0226740 U | 2/1990 |
| WO | 2013160535 A1 | 10/2013 |

* cited by examiner

VARIABLE COMPRESSION RATIO CONNECTING ROD

CROSS-REFERENCE TO RELATED APPLICATION

This U.S. utility patent application claims the benefit of U.S. provisional patent application No. 62/281,489, filed Jan. 21, 2016, the entire contents of which are incorporated herein by reference.

BACKGROUND OF THE INVENTION

1. Field of the Invention

The present invention is related generally to an internal combustion engine and control assembly in which a compression ratio of the engine may be varied.

2. Related Art

The operating performance of an internal combustion engine is affected by, inter alia, a compression ratio in each of the engine's cylinders. One of ordinary skill in the art understands that the compression ratio is the ratio of the maximum volume to the minimum volume in the cylinder of the engine. In general, engines with higher compression ratios operate more efficiently than engines with lower compression ratios, whereas engines with lower compression ratios produce more power than engines with higher compression ratios. Since in most engines, the compression ratio is a fixed number that can only be changed by extensively modifying certain features of the internal combustion engine, most engine manufacturers are forced to make a choice between optimizing efficiency or power or compromising each when designing the internal combustion engine.

Attempts have been made at producing an internal combustion engine which has a variable compression ratio to allow the engine to operate at peak efficiency but also to be able to produce increased power when demanded. However, current variable compression ratio systems are complicated to control, expensive to produce and may lack durability over the life of the engine.

SUMMARY

One aspect of the invention provides a connecting rod assembly for use in an internal combustion engine. The assembly includes a connecting rod body including a shaft extending to a small end, and the small end includes an inner surface presenting a circular bore. A bushing is disposed in the circular bore of the small end. The bushing includes an outer surface in sliding contact with the inner surface of the small end, and the bushing presents a circular opening surrounding a center axis for receiving a wrist pin. The center axis of the circular opening is closer to the shaft of the connecting rod body when the bushing is in a low compression orientation than when the bushing is in a high compression orientation. The outer surface of the bushing includes a first notch and the inner surface of the connecting rod body includes a second notch aligned with the first notch of the bushing to form a pin hole for receiving a locking pin.

Another aspect of the invention provides a method of manufacturing a connecting rod assembly for use in an internal combustion engine. The method includes providing a connecting rod body including a shaft extending to a small end, the small end including an inner surface presenting a circular bore; and disposing a bushing in the circular bore of the small end of the connecting rod, the bushing including an outer surface in sliding contact with the inner surface of the small end, the bushing presenting a circular opening surrounding a center axis for receiving a wrist pin, the center axis of the circular opening being closer to the shaft of the connecting rod body when the bushing is in a low compression orientation than when the bushing is in a high compression orientation, the outer surface of the bushing including a first notch and the inner surface of the connecting rod body including a second notch aligned with the first notch of the bushing to form a pin hole for receiving a locking pin.

Yet another aspect of the invention provides a method for adjusting a compression ratio of an engine. The method includes providing a connecting rod assembly including a connecting rod body, a bushing, and a locking pin. The connecting rod body includes a shaft extending to a small end, and the small end includes an inner surface presenting a circular bore. The bushing is disposed in the circular bore of the small end of the connecting rod. The bushing includes an outer surface in sliding contact with the inner surface of the small end, the bushing presents a circular opening surrounding a center axis for receiving a wrist pin, and the outer surface of the bushing includes a first notch. The inner surface of the connecting rod body includes a second notch aligned with the first notch of the bushing to form a pin hole for receiving the locking pin. The method further includes moving the locking pin in the notch of the connecting rod body, wherein the bushing rotates relative to the connecting body from a low compression position to a high compression position, or from a high compression position to a low compression position. The center axis of the circular opening is closer to the shaft of the connecting rod body when the bushing is in the low compression orientation than when the bushing is in the high compression orientation.

BRIEF DESCRIPTION OF THE DRAWINGS

These and other features and advantages of the present invention will be readily appreciated, as the same becomes better understood by reference to the following detailed description when considered in connection with the accompanying drawings wherein.

DETAILED DESCRIPTION OF EXEMPLARY EMBODIMENTS

Figure 1:
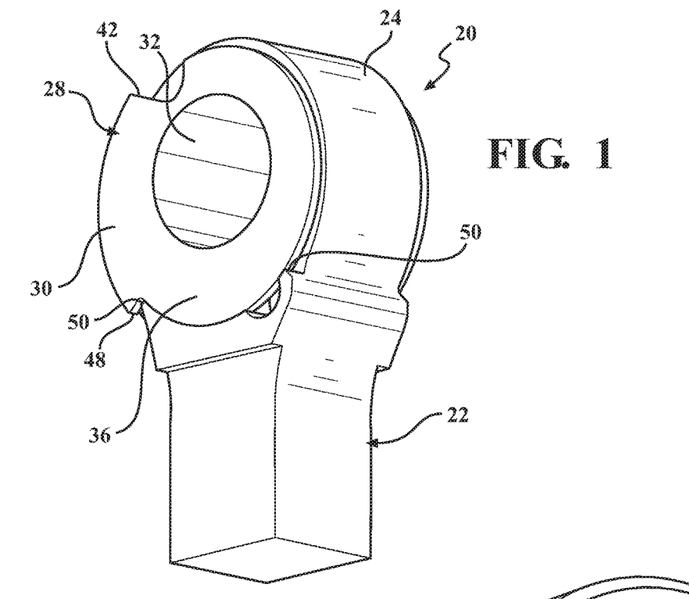
FIG. 1 is a perspective and fragmentary view of a connecting rod assembly with a bushing in a high compression orientation.
Figure 2:
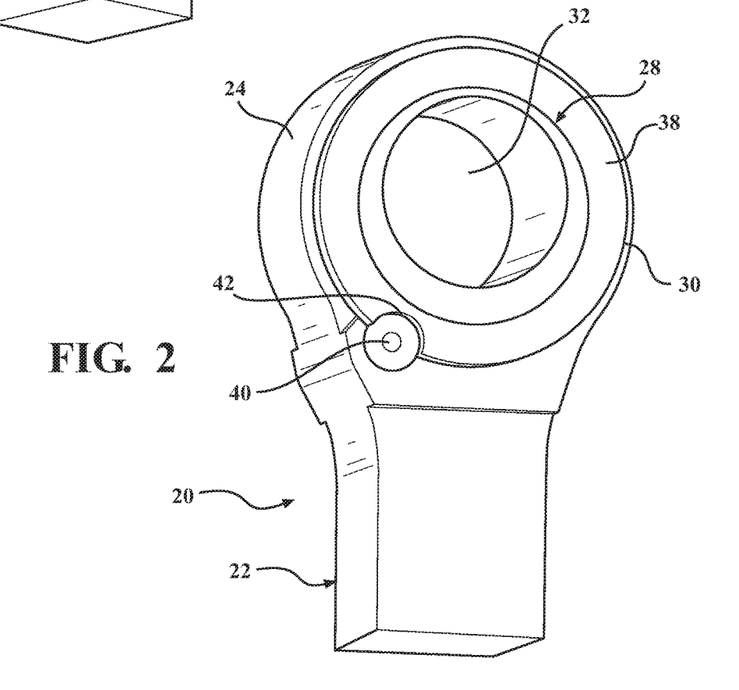
FIG. 2 is another perspective and fragmentary view of the connecting rod assembly of FIG. 1 with the bushing in the high compression orientation and taken from a different location than FIG. 1.
Figure 3:
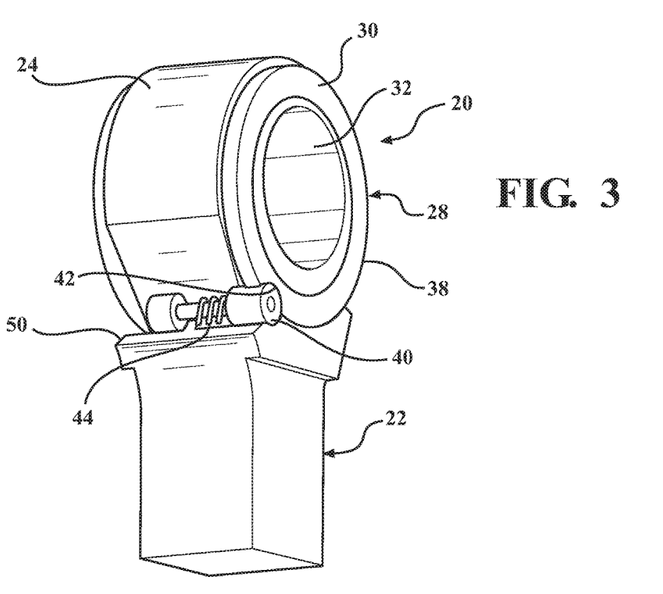
FIG. 3 is fragmentary and sectional view of the connecting rod assembly of FIG. 1 with the bushing in the high compression orientation.
Figure 4:
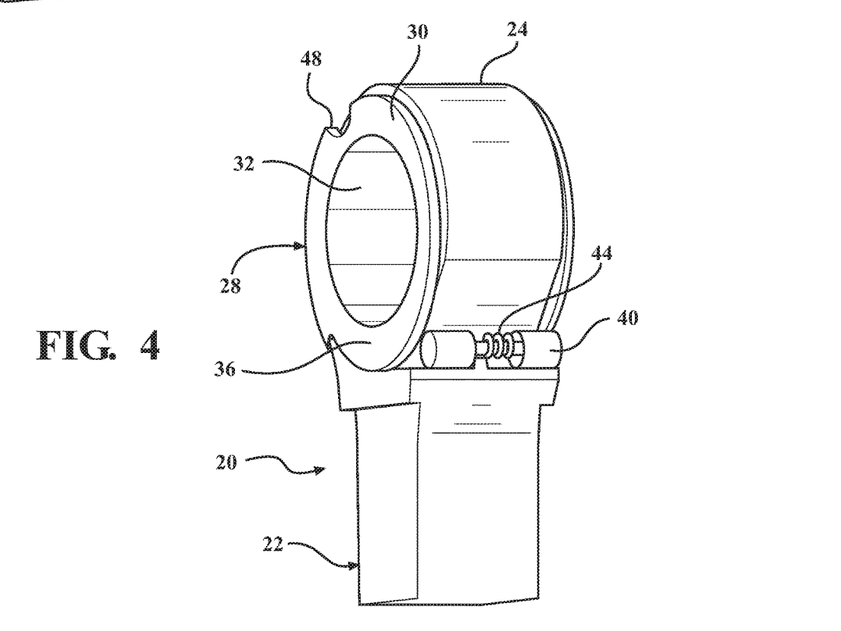
FIG. 4 is another fragmentary and sectional view of the connecting rod assembly of FIG. 1 with the bushing in the high compression orientation and taken from a different location than FIG. 3.
Figures 5, 6:
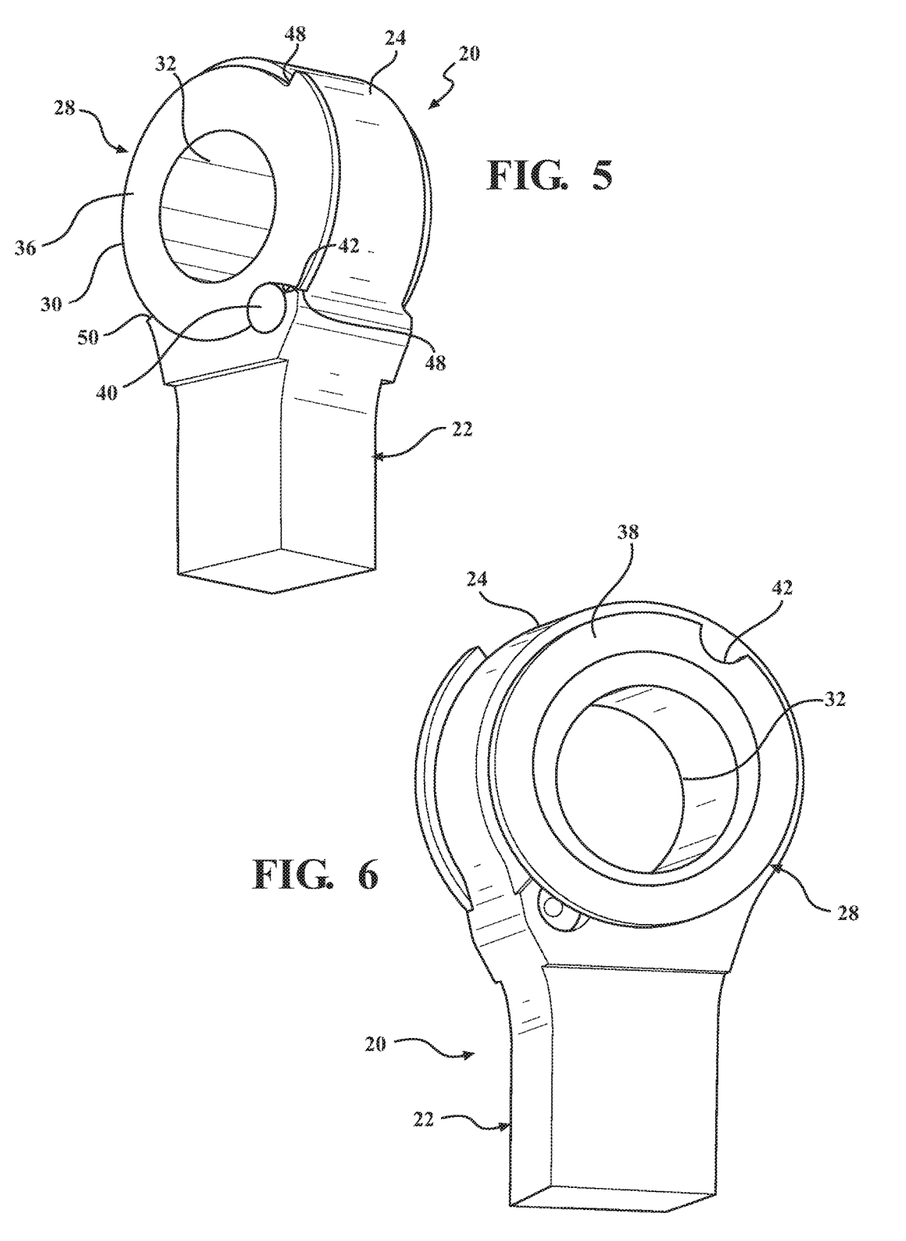
FIG. 5 is a perspective and fragmentary view of the connecting rod assembly of FIG. 1 with the bushing in a low compression orientation.
FIG. 6 is another perspective and fragmentary view of the connecting rod assembly of FIG. 1 with the bushing in the low compression orientation and taken from a different view than FIG. 5.
Figure 7:
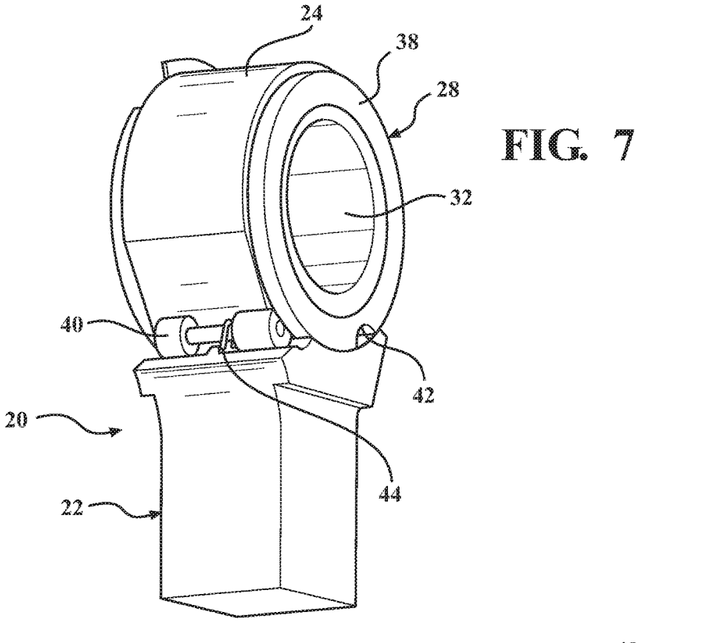
FIG. 7 is a fragmentary and sectional view of the connecting rod assembly of FIG. 1 with the bushing in the low compression orientation.
Figure 8:
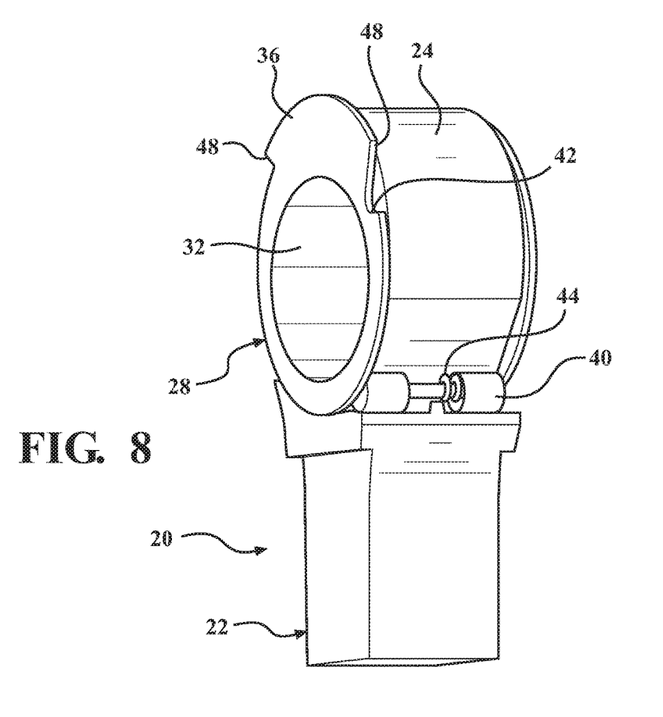
FIG. 8 is another fragmentary and sectional view of the connecting rod assembly of FIG. 1 with the bushing in the low compression orientation and taken from a different view than FIG. 7.

Referring to the Figures, wherein like numerals indicate corresponding parts throughout the several views, a first exemplary embodiment of an improved connecting rod assembly 20 for varying a compression ratio of an internal combustion engine is generally shown in FIG. 1. As shown, the connecting rod assembly 20 includes a connecting rod body 22 which extends along a shaft 23 from a large end (not shown) for attachment to a crankshaft (not shown) of the engine to a small end 24 for attachment to a piston body (not shown) via a wrist pin (also known as a gudgeon pin). The connecting rod body 22 is preferably made of metal, such as for example, steel, alloy steel, aluminum, an aluminum alloy, magnesium, a magnesium alloy, etc.

Figure 11:
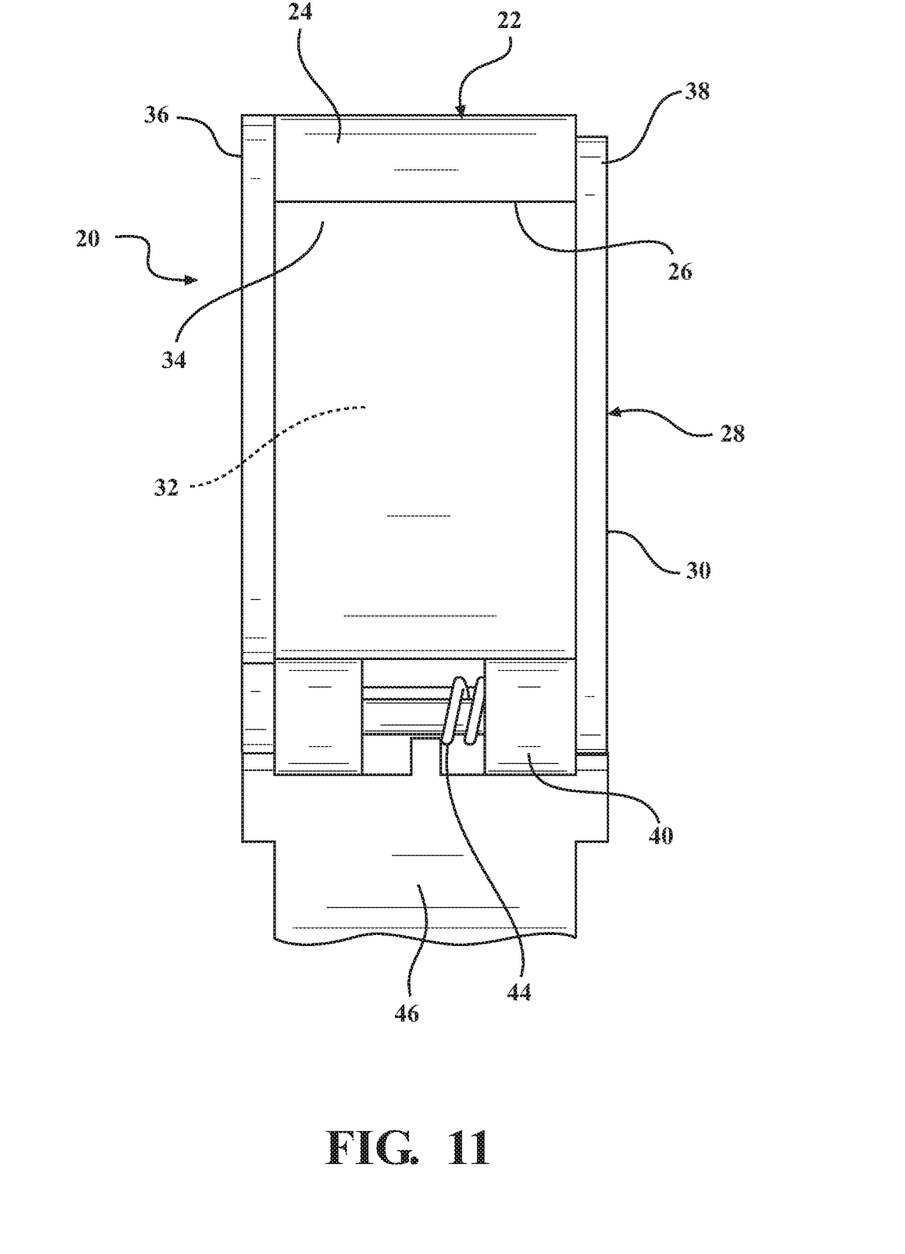
FIG. 11 is a cross-sectional view of the connecting rod assembly if FIG. 1.

The small end 24 of the connecting rod body 22 includes an inner surface presenting a generally circular bore 26 which extends through the connecting rod body 22 from one side to the other side. A bushing 28 is positioned within the circular bore 26 and between the connecting rod body 22 and the wrist pin. The bushing 28 includes a bushing body 30 which has a circular opening 32 surrounding a center axis A for receiving the wrist pin. An outer surface of the bushing body 30 is in sliding contact with the inner surface of the small end 24 of the connecting rod body 22. In the exemplary embodiment of FIG. 11, the bushing body 30 is made of two pieces that are separately made and subsequently joined together. One of the pieces has an axially extending portion 34 and a radially extending portion, or flange 36, and the other piece is generally annular in shape. During assembly, the axially extending portion 34 of the first piece is inserted into the circular bore 26 of the connecting rod body 22 and is brought into contact with the annularly-shaped piece on the other side of the connecting rod body 22. Next, the two pieces are welded together (e.g., through laser welding) or pressed together such that, in final form, the bushing body 30 is one integral piece and has flanges 36, 38 that extend radially outwardly on opposite sides of the connecting rod body 22 to securely connect the bushing body 30 with the connecting rod body 22.

As shown in FIG. 1, the circular opening 32 of the bushing body 30 is eccentrically located relative to the circular bore 26 at the small end 24 of the connecting rod body 22. The circular opening 32 of the bushing body 30 is also eccentrically located relative to the outer surface of the bushing body 30. That is, the center axis A of the circular opening 32 in the bushing body 30 is offset from a center axis of the circular bore 26 in the connecting rod body 22. In the exemplary embodiment, the thickness of the bushing body 30 is varied around the circular opening 32 to eccentrically locate the circular opening 32.

The bushing 28 is rotatable within the circular bore 26 of the connecting rod body 22 to vary the relative positioning of the wrist pin and piston body relative to the crank shaft and thereby change the compression ratio of the cylinder in the engine. When the bushing 28 is in a high compression orientation, shown in FIGS. 1-4, the center axis A of the bushing body 30 is located closer to a distal end 39 of the small end 24 connecting rod body 30 than the shaft 23 of the connecting rod body 22. When the bushing 28 is in the high compression orientation, the engine has a high compression ratio because the piston attached to the connecting rod assembly 20 is located further from the crankshaft, thereby reducing the volume of the combustion chamber (not shown). The high compression ratio of the engine when the bushing 28 is in the high compression orientation maximizes the efficiency of the engine, thereby improving fuel economy and reducing carbon dioxide and other emissions.

On the other hand, when the bushing 28 is in a low compression orientation, shown in FIGS. 5-8, the center axis A of the bushing body 30 is located closer to the shaft 23 of the connecting rod body 22 than the distal end 39 of the small end 24 connecting rod body 30. When the bushing 28 is in the low compression orientation, the engine has a low compression ratio, thereby maximizing the maximum power output of the engine. As such, the bushing 28 allows the engine to produce a high power output when power is demanded and to operate with very high efficiency the remainder of the time. The bushing 28 can be designed for use in a range of different engines including gasoline fueled engines, diesel fueled engines, spark ignition engines, compression ignition engines, two stroke engines and four stroke engines. Preferably, the bushing is configured to adjust the height of the piston body when it is in a top dead center position by approximately 3.5 mm.

Figure 9:
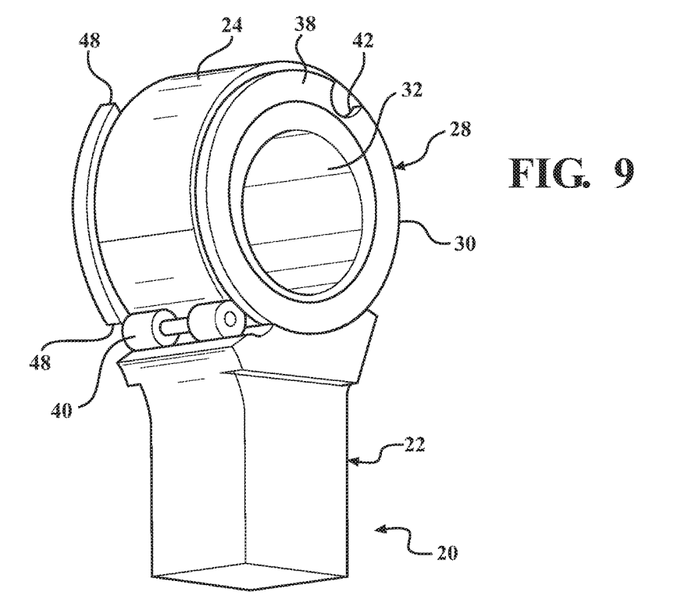
FIG. 9 is a fragmentary and sectional view of the connecting rod assembly of FIG. 1 and showing a pin of the bushing in a neutral position for allowing movement of the bushing.
Figure 10:
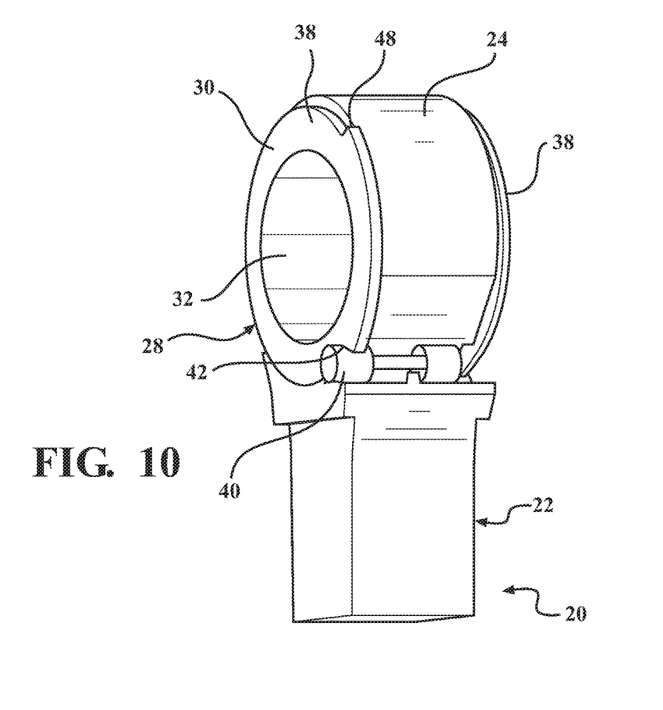
FIG. 10 is another fragmentary and sectional view of the connecting rod assembly of FIG. 1 and showing the pin of the bushing in the neutral position.

The connecting rod assembly 20 further includes a locking mechanism which is configured to lock the bushing 28 in the high and low compression orientations when desired and to selectively allowing inertia to drive the bushing 28 between the two orientations when desired for changing the compression ratio of the engine during use. In the exemplary embodiment of FIGS. 1-11, the locking mechanism includes a locking pin 40 which is disposed in a notch 42 of the connecting rod body 22 adjacent the circular bore 26 and is slidable in an axial direction from a first position (shown in FIGS. 3 and 4) for locking the bushing 28 in the high compression orientation to a second position (shown in FIGS. 7 and 8) for locking the bushing 28 in the low compression orientation. When the locking pin 40 is in either of the first and second positions, it is received within a corresponding notch 42 in one of the flanges 36, 38 on the bushing body 30 to prevent rotation of the bushing 28 relative to the connecting rod body 22. However, when the locking pin 40 is in between the first and second positions as shown in FIGS. 9 and 10, the bushing 28 is freely allowed to rotate between the high compression and low compression orientations.

The locking mechanism of the embodiment of FIGS. 1-11 further includes a spring 44 which biases the locking pin 40 into the first position for locking the bushing 28 in the high compression orientation. In this embodiment, the connecting rod body 22 further includes a hydraulic channel 46 which leads into the notch 42 for conveying a pressurized hydraulic fluid to overcome a biasing force imparted by the spring 44 to move the locking pin 40 into the second position for locking the bushing 28 in the low compression orientation so long as the hydraulic fluid remains pressurized. However, it should be appreciated that a range of different mechanisms could be employed to lock the bushing between the high and low compression orientations.

The connecting rod body 22 and the flanges 36, 38 of the bushing 28 include a mutually cooperative rotational stopping mechanism that defines the high and low compression orientations. The connecting rod body 22 includes a pair of circumferentially spaced apart first shoulders 48, and one of the flanges 36, 38 of the bushing 28 includes a pair of circumferentially spaced apart second shoulders 50. Preferably, the first and second shoulders 48, 50 are spaced apart from one another to allow the bushing 28 to rotate by greater than one hundred and eighty degrees (180°) and by no more than one hundred and ninety degrees (190°) relative to the connecting rod body 22. This allows the first and second shoulders 48, 50 to lock into one another during the compression cycle to reduce loads and wear at the locking pin 40. The first and second shoulders 48, 50 are positioned such that when the bushing 28 is in the high and low compression orientations, little to no torque is applied to the bushing 28, and thus, the locking pin 40 is subjected to minimal sheering forces and has a high durability. In the exemplary embodiment, the first shoulders 48 are located on opposite sides of the shaft 23 adjacent the small end 24 of the connecting rod body 22. One of the first shoulders 48 is located on one side of the notch 42 for the locking pin 40, and the other first shoulder 48 is spaced farther from the notch 42. In the high compression ratio orientation, one of the second shoulders 50 of the bushing 28 engages the first shoulder 48 of the connecting rod body 22 which is spaced from the notch 42, as shown in FIGS. 1-4. In the low compression ratio orientation, one of the second shoulders 50 of the bushing 28 engages the first shoulder 48 of the connecting rod body 22 located on the side of the notch 42, as shown in FIGS. 5-11.

In operation, when increased power is demanded by the driver, the engine electric control unit (ECU) activates a hydraulic pump (not shown) to pressurize the hydraulic fluid 46 in the connecting rod body 22 and thereby move the locking pin 40 out of the first position. The bushing 28 then automatically rotates relative to the connecting rod body 22 due to inertia from the motion of the piston and the connecting rod body 22 from the high compression orientation to the low compression orientation whereupon the locking pin 40 is able to move into the second position in engagement with the notch 42 on one of the flanges 36, 38 of the bushing 28. When the driver no longer requires the increased power, the ECU depressurizes the hydraulic fluid, and the spring 44 urges the locking pin 40 out of the second position. When the locking pin 40 is disengaged from the notch 42, the bushing 28 is automatically rotatable within the small end 24 of the connecting rod body 22 through inertia. Once inertia rotates the bushing 28 back into the high compression orientation, the locking pin 40 is urged by the spring 44 into the first position to lock the bushing 28 into the high compression orientation.

Figures 12, 13:
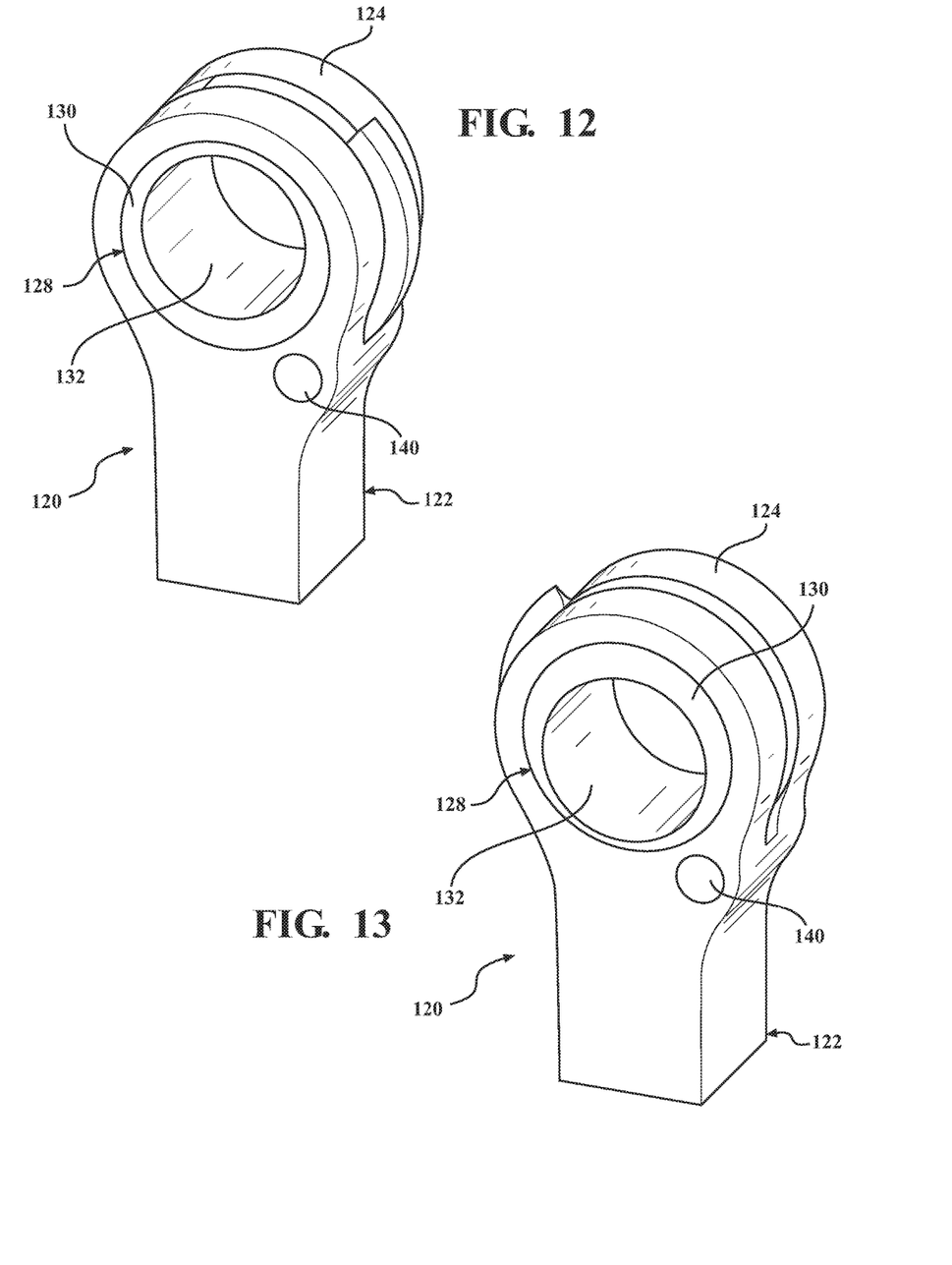
FIG. 12 is a perspective view of a second exemplary embodiment of a connecting rod assembly with a bushing in a high compression orientation.
FIG. 13 is a perspective view of the second exemplary embodiment of the connecting rod assembly with the bushing in a low compression orientation.

Referring now to FIGS. 12 and 13, a second exemplary embodiment of the connecting rod assembly 120 is generally shown with like numerals, separated by a prefix of "1", indicating corresponding parts with the first enabling embodiment discussed above. The second enabling embodiment is distinguished from the first enabling embodiment in that the two piece bushing 128 includes a first cylindrically shaped piece 154 and a second ring shaped piece 156. The ring shaped piece 156 is secured to approximately an axial midpoint of the cylindrically shaped piece 154 and includes an outwardly extending flange 158 which presents shoulders 160 on opposite ends thereof for contacting the connecting rod body 122 when the bushing 128 is in the high and low compression orientations. The ring-shaped piece 156 includes the notches 142 for receiving the locking pin 140 to lock the bushing 128 in the high and low compression orientations as desired. As shown in FIGS. 12 and 13, in this embodiment, the small end 124 of the connecting rod body 122 includes a slot 162 extending from the inner surface to an outer surface, and the ring shaped piece 156 is received in the slot 162. An outer surface of the ring shaped piece 156 is typically disposed along or inwardly of the outer surface of the small end 124, and the flange 158 is disposed outwardly of the outer surface of the small end 124. Thus, one of the shoulders 160 of the flange 158 contacts the connecting rod body 122 adjacent the shaft 123 when the bushing 128 is in the high and low compression orientations. For example, one shoulder 160 of the flange 158 engages the connecting rod body 122 on one side of the notch 142 when the bushing 128 is in the high compression ratio orientation, as shown in FIG. 12; and the other shoulder of the 160 flange 158 engages the connecting rod body 122 in a location spaced from the notch 142 when the bushing 128 is in the low compression ratio orientation.

Obviously, many modifications and variations of the present invention are possible in light of the above teachings and may be practiced otherwise than as specifically described while within the scope of the appended claims.

What is claimed is:

1. A connecting rod assembly for use in an internal combustion engine, comprising:
  a connecting rod body including a shaft extending to a small end;
  said small end including an inner surface presenting a circular bore;
  a bushing disposed in said circular bore of said small end;
  said bushing including an outer surface in sliding contact with said inner surface of said small end;
  said bushing presenting a circular opening surrounding a center axis for receiving a wrist pin;
  said center axis of said circular opening being closer to said shaft of said connecting rod body when said bushing is in a low compression orientation than when said bushing is in a high compression orientation; and
  said outer surface of said bushing including a first notch and said inner surface of said connecting rod body including a second notch aligned with said first notch of said bushing to form a pin hole for receiving a locking pin.

2. The connecting rod assembly of claim 1, wherein said bushing is made of two pieces joined together, a first one of said pieces has an axially extending portion and a radially extending flange, a second one of said pieces includes a radially extending flange having an annular shape, and said flanges extend radially outwardly on opposite sides of said connecting rod body to connect said bushing to said connecting rod body.

3. The connecting rod assembly of claim 1, wherein said bushing has a thickness varying around said circular opening.

4. The connecting rod assembly of claim 1, wherein said connecting rod assembly includes a locking mechanism including said locking pin to lock said bushing in said high and low compression orientations, said locking pin is slidable in an axial direction in said second notch from a first position for locking said bushing in said high compression orientation to a second position for locking said bushing in said low compression orientation.

5. The connecting rod assembly of claim 4, wherein said bushing is able to rotate freely between said high compression orientation and said low compression orientation when said locking pin is between said first and second positions.

6. The connecting rod assembly of claim 4, wherein said locking mechanism includes a spring which biases said locking pin into said first position for locking said bushing in said high compression orientation, and said connecting rod body includes a hydraulic channel leading into said second notch for conveying a pressurized hydraulic fluid to overcome a biasing force imparted by said spring to move said locking pin into said second position for locking said bushing in said low compression orientation.

7. The connecting rod assembly of claim 1, wherein said connecting rod body includes a pair of circumferentially spaced apart first shoulders, said bushing includes a pair of circumferentially spaced apart second shoulders, said first shoulders of said connecting rod body are spaced apart from one another to allow said bushing to rotate by greater than one hundred and eighty degrees (180°) and by no more than one hundred and ninety degrees (190°) relative to said connecting rod body, said second shoulders of said bushing are spaced apart from one another to allow said bushing to rotate by greater than one hundred and eighty degrees (180°) and by no more than one hundred and ninety degrees (190°) relative to said connecting rod body, said first shoulders are located on opposite sides of said shaft adjacent said small end of said connecting rod body, and one of said first shoulders of said connecting rod body is located on one side of said second notch.

8. The connecting rod assembly of claim 7, wherein one of said second shoulders of said bushing engages said first shoulder of said connecting rod body which is spaced from said second notch when said bushing is in said high compression ratio orientation, and the other one of said second shoulders of said bushing engages said first shoulder of said connecting rod body located on said side of said second notch when said bushing is in said low compression ratio orientation.

9. The connecting rod assembly of claim 1, wherein said connecting rod body extends along said shaft from a large end for connection to a crank shaft of the engine to said small end;
said connecting rod body is made of metal;
said metal of said connecting rod body includes at least one of steel, aluminum, and magnesium;
said circular bore of said connecting rod body is circular and extends from one side to an opposite side of said connecting rod body;
said bushing includes a bushing body presenting said circular opening;
said bushing body is made of two pieces joined together;
a first one of said pieces of said bushing body has an axially extending portion and a radially extending flange;
a second one of said pieces of said bushing body includes a radially extending flange having an annular shape;
said flanges extend radially outwardly on opposite sides of said connecting rod body to connect said bushing body to said connecting rod body;
said center axis of said bushing body is offset from a center axis of said circular bore of said connecting rod body;
said bushing body has a thickness varying around said circular opening;
said bushing is rotatable within said circular bore of said connecting rod body to vary relative positioning of the wrist pin relative to the crank shaft;
said connecting rod assembly further includes a locking mechanism including said locking pin to lock said bushing in said high and low compression orientations and to selectively allow inertia to drive said bushing between said orientations for changing the compression ratio of the engine;
said locking pin is slidable in an axial direction in said second notch from a first position for locking said bushing in said high compression orientation to a second position for locking said bushing in said low compression orientation;
said bushing is able to rotate freely between said high compression orientation and said low compression orientation when said locking pin is between said first and second positions;
said locking mechanism includes a spring which biases said locking pin into said first position for locking said bushing in said high compression orientation;
said connecting rod body includes a hydraulic channel leading into said second notch for conveying a pressurized hydraulic fluid to overcome a biasing force imparted by said spring to move said locking pin into said second position for locking said bushing in said low compression orientation so long as the hydraulic fluid remains pressurized;
said connecting rod body includes a pair of circumferentially spaced apart first shoulders;
said first one of said pieces of said bushing body includes a pair of circumferentially spaced apart second shoulders;
said first shoulders are spaced apart from one another to allow said bushing to rotate by greater than one hundred and eighty degrees (180°) and by no more than one hundred and ninety degrees (190°) relative to said connecting rod body;
said second shoulders of said bushing body are spaced apart from one another to allow said bushing to rotate by greater than one hundred and eighty degrees (180°) and by no more than one hundred and ninety degrees (190°) relative to said connecting rod body;
said first shoulders are located on opposite sides of said shaft adjacent said small end of said connecting rod body;
one of said first shoulders of said connecting rod body is located on one side of said second notch;
one of said second shoulders of said bushing body engages said first shoulder of said connecting rod body which is spaced from said second notch when said bushing is in said high compression ratio orientation; and
the other one of said second shoulders of said bushing body engages said first shoulder of said connecting rod body located on said side of said second notch when said bushing is in said low compression ratio orientation.

10. The connecting rod assembly of claim 1, wherein said bushing includes a first cylindrically shaped piece presenting said circular opening and a second ring shaped piece secured to said cylindrically shaped piece;
said second ring shaped piece includes an outwardly extending flange which presents opposite shoulders for contacting said connecting rod body when said bushing is in said high and low compression orientations; and said second ring-shaped piece includes said first notch.

11. The connecting rod assembly of claim 10, wherein said small end of said connecting rod body includes a slot extending from said inner surface to an outer surface;
said ring shaped piece of said bushing is received in said slot;
said flange of said ring shaped piece is disposed outwardly of said outer surface of said small end; and
one of said shoulders of said flange contacts said connecting rod body adjacent said shaft when said bushing is in said high and low compression orientations.

12. The connecting rod assembly of claim 11, wherein one of said shoulders of said flange engages said connecting rod body on one side of said second notch when said bushing is in said high compression ratio orientation, and the other one of said shoulders of said flange engages said connecting rod body in a location spaced from said second notch when said bushing is in said low compression ratio orientation.

13. A method of manufacturing a connecting rod assembly for use in an internal combustion engine, comprising the steps of:
providing a connecting rod body including a shaft extending to a small end, the small end including an inner surface presenting a circular bore; and
disposing a bushing in the circular bore of the small end of the connecting rod, the bushing including an outer surface in sliding contact with the inner surface of the small end, the bushing presenting a circular opening surrounding a center axis for receiving a wrist pin, the center axis of the circular opening being closer to the shaft of the connecting rod body when the bushing is in a low compression orientation than when the bushing is in a high compression orientation, the outer surface of the bushing including a first notch and the inner surface of the connecting rod body including a second notch aligned with said first notch of said bushing to form a pin hole for receiving a locking pin.

14. The method of claim 13 including providing the bushing by joining two pieces together, wherein a first one of the two pieces has an axially extending portion and a radially extending flange and second one of the two pieces includes a radially extending flange having an annular shape; and
the step of disposing the bushing in the circular bore of the small end of the connecting rod includes positioning the bushing such that the flanges extend radially outwardly on opposite sides of the connecting rod body to connect the bushing to the connecting rod body.

15. The method of claim 13, wherein the bushing has a thickness varying around the circular opening.

16. The method of claim 13, wherein the connecting rod assembly includes a locking mechanism including the locking pin to lock the bushing in the high and low compression orientations, the locking pin is slidable in an axial direction in the second notch from a first position for locking the bushing in the high compression orientation to a second position for locking the bushing in the low compression orientation, and the bushing includes a first cylindrically shaped piece presenting the circular opening and a second ring shaped piece secured to the cylindrically shaped piece;
said second ring shaped piece includes an outwardly extending flange which presents opposite shoulders for contacting said connecting rod body when said bushing is in said high and low compression orientations; and
said second ring-shaped piece includes a third notch.

17. The method of claim 13, wherein the bushing includes a first cylindrically shaped piece presenting the circular opening and a second ring shaped piece secured to the cylindrically shaped piece, the second ring shaped piece includes an outwardly extending flange which presents opposite shoulders for contacting the connecting rod body when the bushing is in the high and low compression orientations, the second ring-shaped piece includes a third notch, and wherein the small end of the connecting rod body includes a slot extending from the inner surface to an outer surface; and
wherein the step of disposing the bushing in the circular bore of the small end of the connecting rod includes disposing the ring shaped piece of the bushing in the slot such that the flange of the ring shaped piece is disposed outwardly of the outer surface of the small end, and one of the shoulders of the flange contacts the connecting rod body adjacent the shaft when the bushing is in the high and low compression orientations.

18. A method for adjusting a compression ratio of an engine, comprising the steps of:
providing a connecting rod assembly including a connecting rod body, a bushing, and a locking pin;
the connecting rod body including a shaft extending to a small end, the small end including an inner surface presenting a circular bore;
the bushing being disposed in the circular bore of the small end of the connecting rod, the bushing including an outer surface in sliding contact with the inner surface of the small end, the bushing presenting a circular opening surrounding a center axis for receiving a wrist pin;
the outer surface of the bushing including a first notch and the inner surface of the connecting rod body including a second notch aligned with said first notch of said bushing to form a pin hole for receiving the locking pin; and
moving the locking pin in the second notch of the connecting rod body, wherein the bushing rotates relative to the connecting body from a low compression position to a high compression position, or from a high compression position to a low compression position, and the center axis of the circular opening is closer to the shaft of the connecting rod body when the bushing is in the low compression orientation than when the bushing is in the high compression orientation.

19. The method of claim 18, wherein the step of moving the locking pin in the second notch of the connecting rod body includes conveying a pressurized hydraulic fluid though a hydraulic channel of the connecting rod body into the second notch to move the locking pin.

20. The method of claim 18, wherein the connecting rod body includes a pair of circumferentially spaced apart first shoulders, the bushing body includes a pair of circumferentially spaced apart second shoulders, the first shoulders are located on opposite sides of the shaft adjacent the small end of the connecting rod body, and one of said first shoulders of the connecting rod body is located on one side of the second notch; and
the step of rotating the bushing including engaging one of the second shoulders of the bushing body with the first shoulder of the connecting rod body which is spaced from the second notch to position the bushing in the high compression ratio orientation or engaging the other one of the second shoulders of the bushing body with the first shoulder of the connecting rod body located on the side of the second notch to position the bushing in the low compression ratio orientation.

\* \* \* \* \*